Aug. 2, 1960 J. W. KAPPEN 2,947,436
INSULATED CONTAINER
Filed July 19, 1956 3 Sheets-Sheet 1
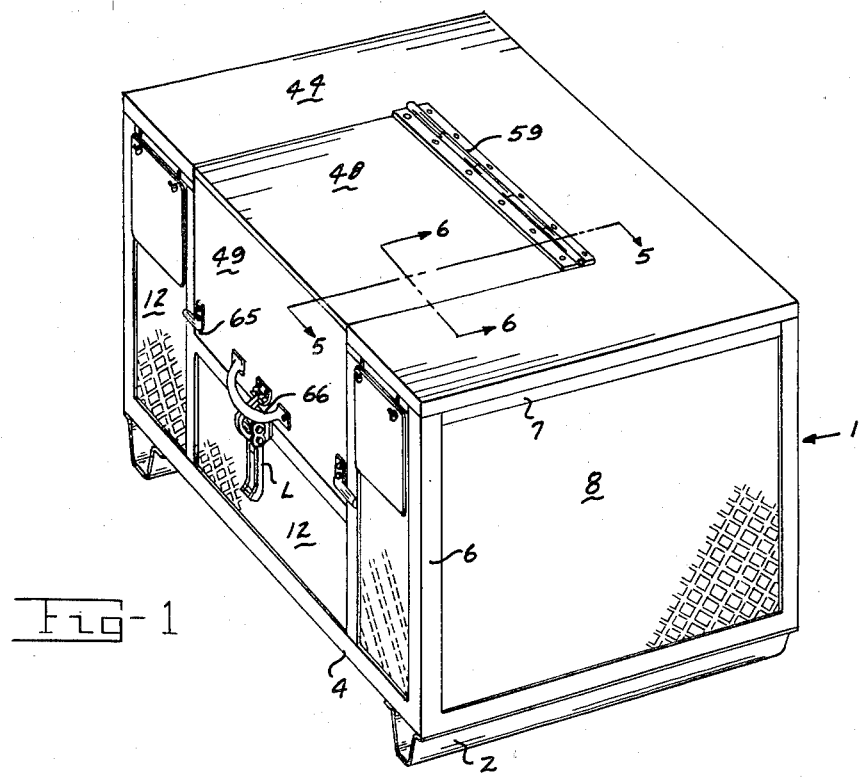
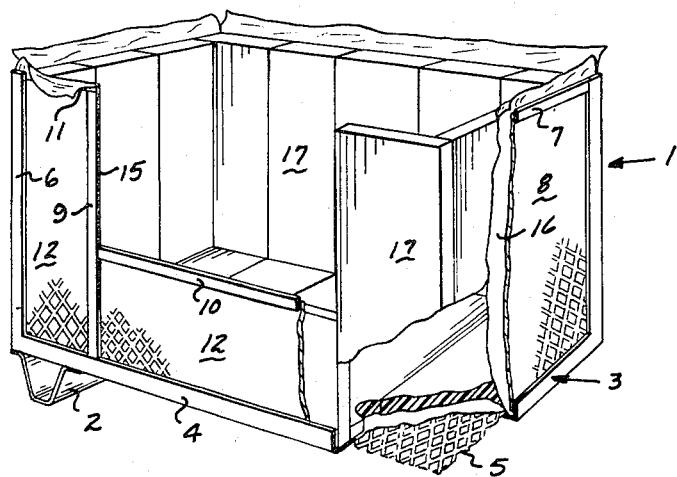
INVENTOR.
JOHN W. KAPPEN
BY Tom Walker
ATTORNEY Aug. 2, 1960  J. W. KAPPEN  2,947,436
INSULATED CONTAINER
Filed July 19, 1956  3 Sheets-Sheet 3
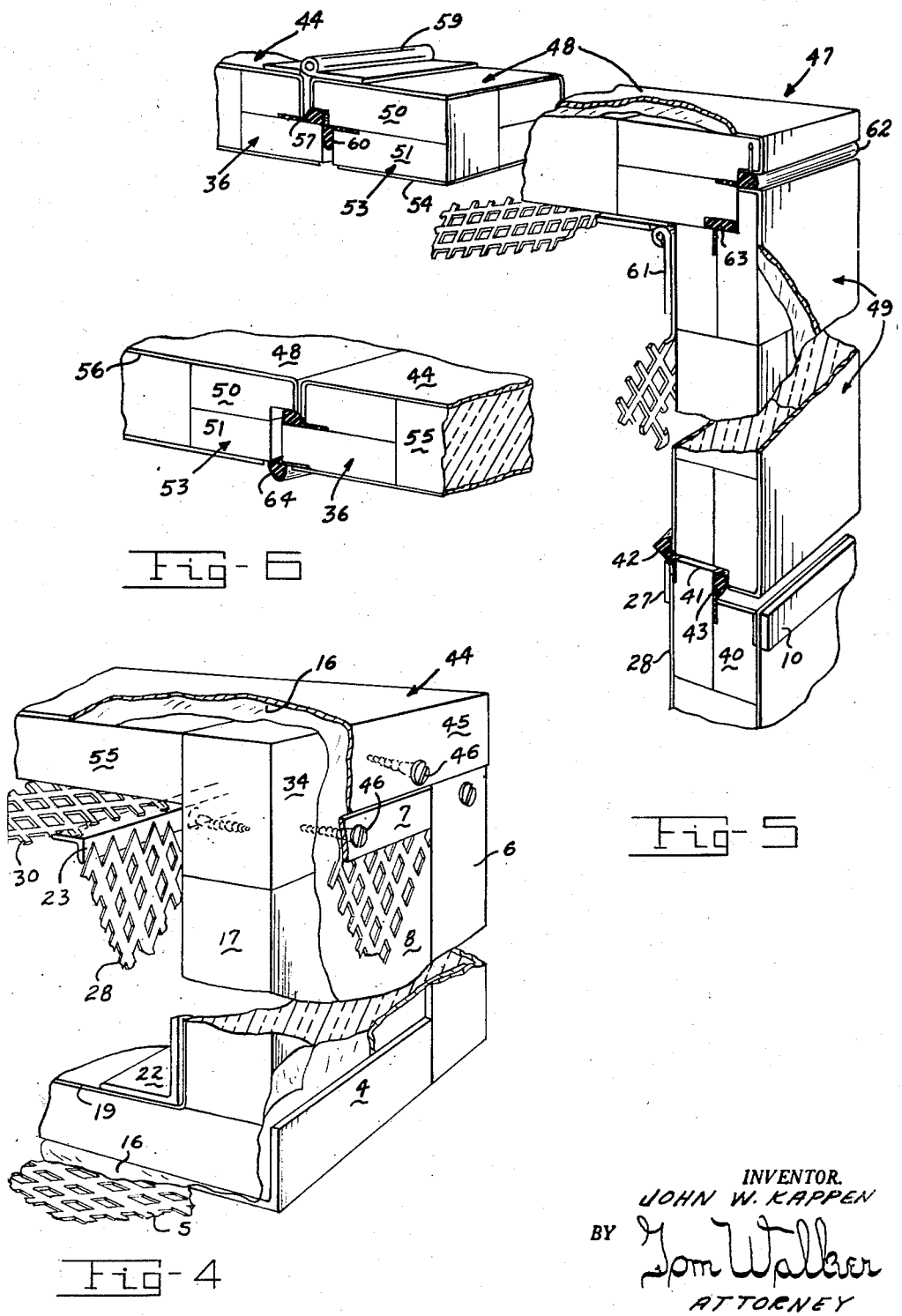
INVENTOR.
JOHN W. KAPPEN
BY
ATTORNEY

United States Patent Office 2,947,436
Patented Aug. 2, 1960

2,947,436

INSULATED CONTAINER

John W. Kappen, 243 Kenwood Ave., Dayton, Ohio

Filed July 19, 1956, Ser. No. 598,878

5 Claims. (Cl. 220—10)

This invention relates to containers and more particularly to insulated containers applicable for use in storage and transport of frozen foods.

The rapid and substantial increase in acceptance and use of frozen foods by the public has created a food handling problem of a considerable nature. The expansion of the frozen food industry has resulted in many scattered freezing and refrigerating plants which process frozen foods. While the demands for such foods were limited, the refrigerated transport vehicles available for their delivery to major areas were adequate to prevent major spoilage in transport. Today, however, the demands for these products have come from all areas so that trans-shipment of foods from central freezing and refrigerating warehouses in each state is generally necessary. These central warehouses must ship, by ordinary truck or inadequately refrigerated vehicles, to retail stores and consumers many hours away. The inadequacy of the shipping containers previously supplied has resulted in much food spoilage in transit. Also, many of these prior art containers require considerable quantities of chipped or Dry Ice to help prevent rapid food spoilage. This involves a cumbersome and laborious procedure in packing the frozen food for shipment, and it adds much bulk and weight to the container. The efficiency of these prior art containers is very low and the refrigerating temperature of the food can be maintained only for brief periods of time in shipment thereof.

The subject invention was developed as the solution to this serious problem facing the frozen food industry. It provides an improved insulated unit consisting of nested insulating container elements. The container elements are so related that on exposure of the container to the refrigerating temperature of the frozen foods and introducing the foods into the container so provided, the foods will be maintained at or about this refrigerating temperature for twenty-four to thirty hours while being transported in an ordinary vehicle having no additional refrigerating capacity. As will be evident, frozen food spoilage in transport will be substantially eliminated by the use of the present container.

The object of the invention is to simplify the construction as well as the means and mode of operation of insulated containers, whereby such containers may not only be economically manufactured, but will be more efficient and satisfactory in use, adaptable to a wide variety of applications, and be unlikely to get out of repair.

Another object of the invention is to provide an improved container particularly applicable to use in the storage and transport of frozen foods, which is so constructed as to have the ability to maintain frozen foods near their original refrigerating temperatures for more than twenty-four hours.

A further object of the invention is to provide an improved insulating container consisting of nested shells of expanded metal employing layers of insulating material therebetween with an improved sealing relation thereto.

An additional object of the invention is to provide an improved insulated container consisting of inner and outer shells of expanded metal having liners of metal foil within the outer shell and "Fiberglas" without the inner shell whereby on reducing the temperature of the container to a freezing level and sealing it with frozen food therein at that temperature, the temperature of the food will be maintained for a period of twenty-four to thirty hours, even when the container is stored in an ordinary vehicle.

A further object of the invention is to provide an insulated container possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention, Fig. 1 is a perspective view of the container assembly as afforded by the invention.

Fig. 2 is a perspective view, in fragmentary fashion, of the construction of the outer shell of the assembly of Fig. 1.

Fig. 4 is a fragmentary perspective view showing construction details of the container assembly.

Fig. 5 is a cross-sectional view of the closure device of the assembly of Fig. 1 taken on line 5—5 thereof and partially broken away for detail of construction.

Fig. 6 is a cross-sectional view of the closure means taken on line 6—6 of Fig. 1.

Like parts are indicated by similar characters of reference throughout the several views.

Figure 3:
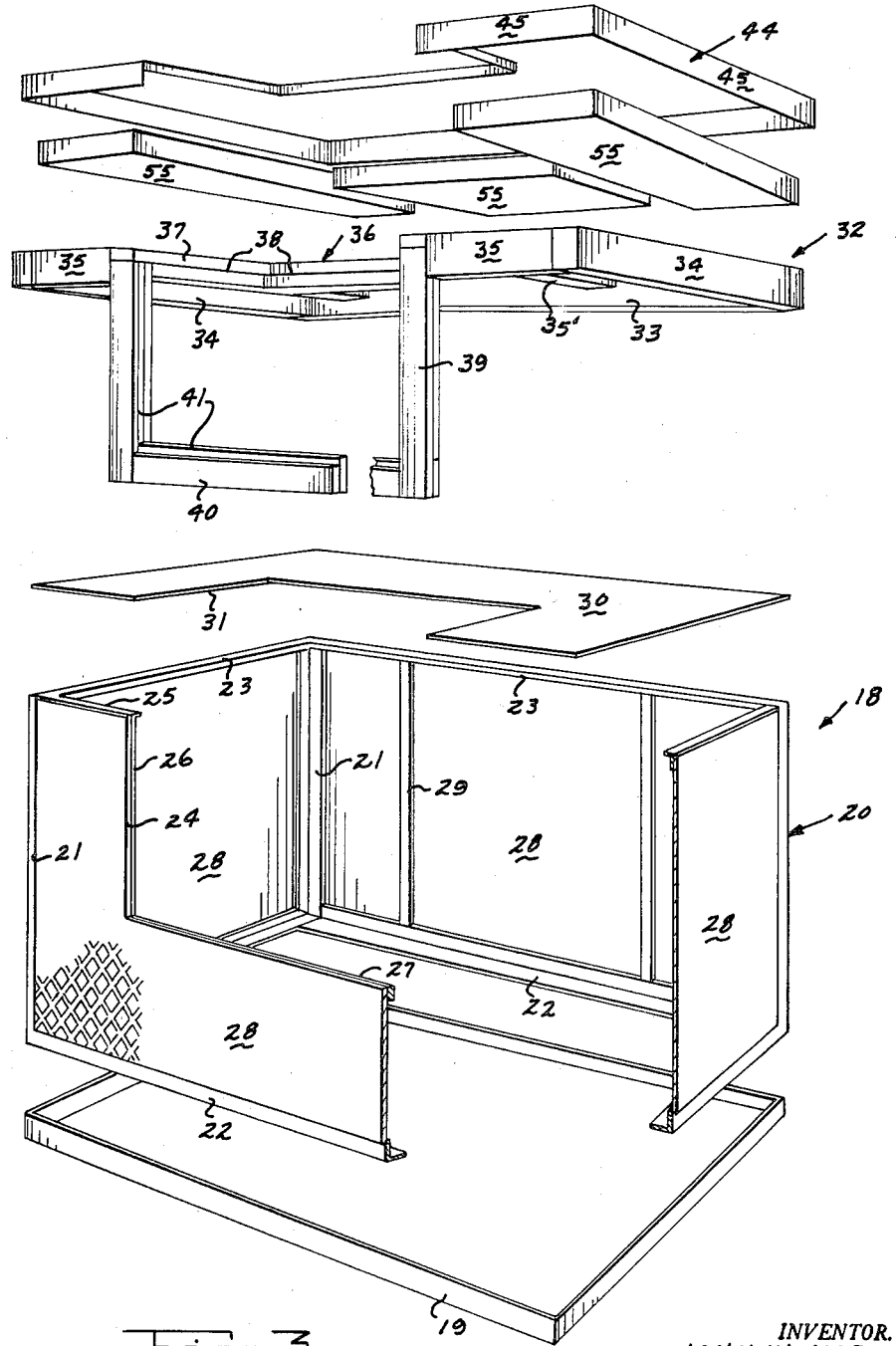
Fig. 3 is an exploded perspective view of the inner shell of the assembly of Fig. 1.

Referring to the drawings the container assembly afforded by the invention as illustrated has a rectangular box-like configuration. The outer shell 1 thereof is mounted on parallel metal glide supports 2. The shell 1 consists basically of a rectangular skeleton framework 3 fabricated of angle iron. The framework 3 consists of a rectangular base section formed of four lengths of angle iron welded to provide an open tray 4. A sheet 5 of expanded metal is seated in the tray 4 to span the opening therein and is fixed thereto by any suitable means. Fixed at each of the corners of the base tray 4 is an identical vertically extending frame section 6 of angle iron. The vertical frame sections 6 define the lateral boundaries of the shell 1. The back and side frames of the shell 1 are completed by metal strips 7 connecting the upper ends of the frame sections 6 at the back and sides of the shell. Rectangular sheet sections 8 of expanded metal are fixed to the inner surfaces of the back and side framework of the shell as provided by the tray 4, the vertical elements 6 and the connecting metal strips 7, to span the openings provided therein.

To the base tray 4 at the front of the shell 1 is fixed a pair of parallel vertically extending metal strips 9 in substantially spaced relation. The strips 9 are connected by a metal strip 10 welded thereto toward the lower extremities thereof in spaced parallel relation to the base 4. The upper ends of the strips 9 are respectively connected by metal strips 11 to adjacent vertical frame sections 6 at their upper extremities. The connection of the elements of the framework 3 is preferably effected by welding as noted herein, but any other suitable connecting means may be employed. To complete the shell 1, rectangular sections 12 of expanded metal are fixed to the inner surfaces of the frame at the front thereof extending from the base 4 to the strips 11 and between the strips 9 and the adjacent elements 6 and centrally from the base 4 to the strip 10 between the strips 9. This effects a box-like shell 1 of expanded metal open at the top and at the top central section 15 of the front panel thereof.

The shell 1 is provided with a continuous inner liner 16 of aluminum foil applied to the inner surface thereof. Applied to the inner surface of the line 16 are a number of rectangular blocks 17 of "Fiberglas" arranged in closely adjacent abutting relation to cover the floor and sides of the shell and provide a complete "Fiberglas" secondary lining within the shell 1.

The inner shell 18 of the container assembly consists of a rectangular tray 19 which seats in the outer shell 1 in nested relation in the "Fiberglas" blocks 17 defining the floor and sides thereof as a secondary inner lining. A rectangular frame 20 open at the top and bottom thereof seats in the tray 19 in closely nested relation to the sides of "Fiberglas" lining provided by blocks 17.

The frame 20 is formed similarly to the frame 3 but in reduced dimensions. The frame 20 consists of identical vertical members 21 of angle iron which are rectangularly connected at their lower extremities by sections 22 of angle iron which form the base thereof. Sections 23 of angle iron connect the vertical members 21 at their upper extremities to complete the back and sides of the frame 20. The configuration of the upper extremity of the front of the frame 20 provides a top central cut out portion 24 which is open upwardly thereof. Sections 25 of angle iron extend from the upper ends of the members 21, laterally defining the front of the frame 20, parallel to the base element 22 at the front of the frame. The inner extremities of sections 25 are spaced similarly to the elements 11 of the outer shell and connect to vertically depending strips 26 aligning with the strips 9 in the outer shell 1 in the nested relation of the frame 20. The lower ends of the strips 26 are connected by a horizontal strip 27 of metal which is parallel to the base member 22 and aligns with the strip 10 on the front of the shell 1 as the frame 20 seats. Rectangular panels 28 are fixed about the frame 20 to cover the sides and back thereof, and the front, as defined by the frame configuration at the front. The panels 28 are also of expanded metal, and are preferably welded to the frame sections of the frame 20 which they span and abut, at the outer surfaces thereof. Vertical metal reinforcing strips 29 arranged in spaced relation connect the upper and lower frame members 22 and 23 at the back of the frame 20.

A substantially rectangular U-shaped outer panel 30 of expanded metal is mounted to have its outer perimeter lie on and coextensive with the sections 23 and 25 of angle iron defining the upper extremity of the frame 20. This provides a cover on the inner shell 18 of the container assembly. A rectangular U-shaped panel 30 has the forward central opening 31 aligned with the opening 24 in the front panel of the frame 20 to provide a rectangular extension thereof to the top of the frame.

Thus, the inner shell 18 of the container assembly is provided in nested relation to the outer shell 1 and spaced therefrom by the primary liner 16 and the secondary liner effected by "Fiberglas" blocks 17.

A wooden cover frame 32 is mounted over the inner shell 18 and on the upper limits of the "Fiberglas" blocks 17, lining the outer shell 1 in secondary fashion. The open wooden frame 32 assumes the rectangular U-shaped outline of the top panel 30 of the inner shell 18. The outer perimeter of the frame seats to the upper surface of the "Fiberglas" liner between the inner and outer shells and comprises a back beam 33 having side beams 34 connected at right angles thereto and extending in parallel relation from the respective ends thereof. Short front beams 35 extend inwardly at right angles from the outer extremities of the beams 34 between the upper frame members 25 and 11 of the inner and outer shells and are substantially coextensive therewith. A rectangular U-shaped frame section 36 lies within and in the plane of the frame 32 at the forward central section thereof with the parallel side elements 37 thereof opening forwardly and connected at their extremities to the inner ends of beams 35 respectively.

The inner perimeter of the frame section 36 is stepped at the upper surface thereof providing a flange 38 projecting inwardly from the under portion of the frame section. The flange 38 lines the rectangular cut out section 31 of the plate 30 on the inner shell 18 as it seats thereto. A rubber sealing strip 57 is anchored to the upper face of the flange 38 coextensive therewith.

Connected in depending relation to the outer ends of elements 37 and the respective ends of beams 35, to which they connect, are vertically depending parallel members 39. The members 39 are connected at their opposed lower extremities by a transverse member 40 to effect a depending rectangular U-shaped wooden frame section. The frame section thus defined by members 39 and 40 is stepped about its internal perimeter at the outer surface thereof to provide an internal flange 41 forming a continuation of the flange 38. The members 39 and 40 seat between the shells 18 and 1 to the "Fiberglas" lining 17, to frame the aligned cut out portions 24 and 15 therein and have the flange 41 project inwardly thereof adjacent the inner shell 18. A rubber sealing strip 42 seats between the inner surface of the members 39 and 40 and the outer surface of the inner shell to have the bead projecting into the cut out portion 24 of the inner shell in framing relation thereto. A second rubber seal 43 is secured to the outer face of the flange 41. Additional beams 35' connect the front beams 35 and the rear beam 33 and seat on the top panel 30 of the inner shell 18 as the frame 32 seats intermediate the inner and outer shells to project outwardly and upwardly therefrom. Screws are employed to connect the shells to the sections of the frame 32 therebetween to fix the relation thereof.

Blocks 55 of "Fiberglas" insulation seat within the boundaries of the frame 32 as defined by the beams 33, 34, 35, and frame section 36 in closely abutting adjacent relation. The aluminum foil liner 16 is extended up and over the frame 32 and the blocks of "Fiberglas" therein.

A metal rectangular U-shaped cover element 44 having depending sides 45 seats over the covered frame 32 to dispose the lower extremities thereof in sealing contact with the upper extremity of the frame defining the shell 1. Screws 46 are provided to secure the shell 1 and the cover 44 to the wooden frame unit 32 as well as the frame 20 of the inner shell 18 to the frame 32.

This provides an insulated container unit having a continuous central opening to the front and inwardly of the top thereof providing access to the interior of the container thereby. This continuous opening is defined by the depending sections 39 and 40 to the front of the container forming a continuation of the frame section 36 defining the opening in the top of the container.

A hinged closure element 47 is provided to seal the continuous opening thus afforded in the nesting of the inner and outer shells of the container unit. The closure 47 consists of a rectangular top closure panel 48 hingedly and sealingly connected to a similar front closure panel 49. Each of the panels 48 and 49 consists of a rectangular wooden frame 53 made in two layers 50 and 51, the outer layer 50 projecting beyond the inner layer 51 about the entire periphery thereof. Within each frame 53 and bounded thereby is a layer of "Figerglas." Over each frame 53 and the "Fiberglas" therein is a layer 56 of aluminum foil. A metal sheet 54 is applied to the inner and outer surfaces of the panel structures thus effected, the upper sheet 54 being bent about the projecting portions of the frame structure to which it is applied and being secured thereto by nails as shown in Fig. 5 of the drawings.

A butt hinge 59 has one leaf thereof fixed to the top cover 44 immediately adjacent and to the rear of the opening therein. The other leaf of the hinge 59 is similarly connected by screws to the upper surface of the rear projecting portion of the top closure panel 48 so that the panel 48 is hinged thereby to span and close the opening in the top of the container in its lowermost position. As panel 48 closes the opening, the projecting peripheral portions thereof seat to the flange 38 lining the opening and seal to the strip 57 thereon in the process. The panel 48 also has a sealing strip of rubber 60 fixed thereto opposed to the internal surface of flange 38 at the rear thereof to afford an additional seal therebetween as the panel 48 is closed. Inner seal strips 64 are fixed to the innermost surface of each side member 37 of the frame 36 to project under the panel 48 at the sides thereof, providing an inner seal as the panel closes.

The front closure panel 49 is hinged to the top closure panel 48 by a butt hinge 61 respectively fixed by screws by screws to adjacent undersurfaces of the panels. This arrangement provides that the upper projecting portion of the panel 49 overlaps the outer projecting portion of panel 48 and the panel 49 depends at right angles to and forms a continuation of the panel 48 in its closed position over the front opening in the container. Thus, as the front panel is moved vertically, it will fold back on the inner surface of the top panel to provide access to the container.

The panel 48 has a rubber seal strip 62 secured to its outer end surface under the projecting portion thereof, and as the panel 49 is closed, the seal is compressed therebetween. Also, a similar seal strip 63 is secured to this mating end of the panel 49 which is compressed and sealed to the under surface of the outer projection of the top panel 48, affording an inner seal thereby. As the panel 49 closes the front container opening, the side and lowermost projections thereon seat to the flange 41 lining the opening and compress the seal strips 43 thereby forming an outer seal thereabout. The panel also abuts the inner seal strip 42 providing an inner seal thereto in the process. Accordingly, in its seated position, the closure assembly 47 affords a complete hermetic seal of the container assembly so completed.

A latch assembly L is connected to the panel 49 at its outer surface and to the strip 10 of the front shell to afford means for latching of the cover as desired. No detail thereof is presented since any convenient latch means may be employed for this purpose. Limit brackets 65 are fixed to the outer surface of panel 49 adjacent the sides thereof to project laterally therefrom and limit the seating of the panel 49. The brackets 65 also serve to support the door panels 48—49 in open position, the brackets 65 resting on the top panel 44 at the sides of the opening therein. A handle 66 is also provided on the panel 49 to facilitate the opening thereof. The handle is grasped to initially lift the panel 49 upwardly of the container to break the seal therebetween and lift the panel 48 thereby. The panel 48 is swung back by an upward and rearward movement of the panel 49 which is folded to the inner surface thereof as the opening is completed to permit loading or unloading of the container.

As noted previously, this container was particularly developed for use in transporting frozen foods in ordinary vehicles. In use for this, the container is first opened and placed in the refrigerating section storing the frozen foods and left till the temperature of the container is that of the foods. The frozen food is then loaded in the container and the cover closed as described to hermetically seal the container. The loaded container may then be removed from the storage area and loaded in any type of vehicle. The efficiency of the sealed container is of a nature that it will maintain the freezing temperature of the food therein for as much as thirty hours while exposed to the normal temperature range of the outer air. Thus, any ordinary shipment of frozen food may be made in the container of the invention without the need of additional refrigerating means and with a complete maintenance of the freezing temperature thereof as long as the shipment is within a thirty-hour range. This range, it must be noted, is sufficient to complete deliveries for great distances, employing ordinary vehicles available for commercial transportation.

A highly advantageous container unit of an insulating nature is thus afforded by the invention. The unit thus provided has many applications and only the most pertinent to its development has been described to illustrate the principles involved and the nature thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An insulated container comprising, a receptacle having an inner lining of metal foil, a secondary lining of Fiberglas uniformly applied to said inner lining, a second receptacle of expanded metal contained by said secondary lining, said secondary lining and foil affording a complete air and moisture impervious packing about said second receptacle, a non-conductive cover frame seated to and about said second receptacle affording access thereto and connected to said first receptacle in sealing relation thereto, and an insulator closure panel removably mounted to said cover frame to normally seal the access to said second receptacle whereby a container obtains which may be employed to ship frozen foods in ordinary vehicles and maintain their freezing temperatures for as much as thirty hours.

2. An insulated container for use in the transport of frozen food comprising, a box-like frame having sheets of expanded metal fixed thereto providing a shell open at the top, a second box-like frame open at the top having sheets of expanded metal fixed thereto seating within said shell, insulating means about said second frame and its sheets of expanded metal, means providing an impervious seal about said insulating means within said first mentioned frame, non-metallic means connecting said frames at the top and defining an opening to said inner frame, and an insulated cover means closing said opening defined by said non-metallic means in said frames including a displaceable closure panel affording access to said inner frame as required.

3. A container comprising, an inner shell of expanded material providing a continuous opening at the front and top thereof, an outer shell of expanded material affording aligned openings, a first liner of aluminum foil between said shells, a second liner of insulated Fiberglas between said shells, a non-metallic framing means connecting said inner and outer shells about the continuous openings therein providing sealing means thereon and preventing heat transfer therebetween, and an insulated cover means including a closure panel hingedly connected thereto mounted to said shells and sealing to said container over the continuous opening therein, affording a hermetically sealed container thereby.

4. A container comprising, a rectangular box-like frame of angle iron having sheets of expanded metal fixed internally thereof to form an outer shell open at the top and centrally to the front thereof, glide supports fixed to said outer shell, and air and moisture impervious liner over the inner surface of said shell, blocks of insulating fiber applied in adjacent relation to the bottom and sides of said outer shell over said liner, an inner receptacle of metal, open at the top thereof, nested in said insulating blocks and contained thereby, a sheet of expanded metal having an opening therein mounted over the opening in said inner receptacle, a wooden cover frame seating over said sheet of expanded metal and intermediate said receptacle and said outer shell, preventing metal to metal contact therebetween and a metal cover means seating over said wooden frame to said shell providing an insulated hermetically sealed container thereby and including a removable panel affording access to said receptacle.

5. An insulated container comprising, a rectangular box-like outer frame having panels of expanded metal applied to the bottom and sides thereof, a layer of aluminum foil over the inner surface of said frame, a layer of Fiberglas over the inner surface of said foil, a metal tray seating in nesting relation to said layer of Fiberglas, a box-like inner frame having panels of expanded metal fixed thereto and forming the sides thereof, said inner frame seating to said tray in closely nested relation to said Fiberglas about the sides thereof, a sheet of expanded metal seating over the top of said inner frame providing an aperture therein, non-metallic connecting means seated to said layer of Fibergals intermediate said frames and connected thereto, insulating means over said sheet of expanded metal about the aperture therein, said aluminum foil being extended over said insulating means, cover means seating over said insulating means to said outer frame and defining said aperture and closure means sealing said aperture providing a hermetically sealed container for frozen foods and the like.

References Cited in the file of this patent
UNITED STATES PATENTS

| | | |
|---|---|---|
| 624,165 | Bowdish | May 2, 1899 |
| 1,799,744 | Gruber | Apr. 7, 1931 |
| 1,854,089 | Willsie | Apr. 12, 1932 |
| 1,903,169 | Cordrey | Mar. 28, 1933 |
| 1,967,611 | Finck | July 24, 1934 |
| 2,073,990 | Koch | Mar. 16, 1937 |
| 2,169,419 | Hofferberth et al. | Aug. 15, 1939 |
| 2,194,301 | Fourness | Mar. 19, 1940 |
| 2,434,361 | Iwashita | Jan. 13, 1948 |
| 2,502,781 | Erickson | Apr. 4, 1950 |
| 2,644,605 | Palmer | July 7, 1953 |
| 2,768,046 | Evans | Oct. 23, 1956 |